(12) United States Patent
Sujan et al.

(10) Patent No.: US 8,549,838 B2
(45) Date of Patent: Oct. 8, 2013

(54) SYSTEM, METHOD, AND APPARATUS FOR ENHANCING AFTERTREATMENT REGENERATION IN A HYBRID POWER SYSTEM

(75) Inventors: Vivek Anand Sujan, Columbus, IN (US); Martin T. Books, Columbus, IN (US); Morgan Andreae, Columbus, IN (US); Patrick Djan-Sampson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 284 days.

(21) Appl. No.: 12/907,696

(22) Filed: Oct. 19, 2010

(65) Prior Publication Data

US 2012/0090301 A1 Apr. 19, 2012

(51) Int. Cl.
*F01N 3/00* (2006.01)
(52) U.S. Cl.
USPC .......... 60/285; 60/274; 60/277; 60/280; 60/297; 180/65.265; 180/65.275; 180/65.285; 180/65.29
(58) Field of Classification Search
USPC ............ 60/274, 277, 280, 284, 285, 295, 60/297, 301; 180/65.1, 65.265, 65.275, 65.28, 180/65.285, 65.29, 309
See application file for complete search history.

(56) References Cited

U.S. PATENT DOCUMENTS

| | | | |
|---|---|---|---|
| 3,566,717 A | 3/1971 | Berman et al. |
| 3,732,751 A | 5/1973 | Berman et al. |
| 3,923,115 A | 12/1975 | Helling |
| 4,021,677 A | 5/1977 | Rosen et al. |
| 4,099,589 A | 7/1978 | Williams |
| 4,165,795 A | 8/1979 | Lynch et al. |
| 4,233,858 A | 11/1980 | Rowlett |
| 4,305,254 A | 12/1981 | Kawakatsu et al. |
| 4,335,429 A | 6/1982 | Kawakatsu |
| 4,405,029 A | 9/1983 | Hunt |
| 4,407,132 A | 10/1983 | Kawakatsu et al. |
| 4,428,190 A | 1/1984 | Bronicki |
| 4,438,342 A | 3/1984 | Kenyon |

(Continued)

FOREIGN PATENT DOCUMENTS

| | | |
|---|---|---|
| WO | 2006135871 A2 | 12/2006 |
| WO | 2010116104 A1 | 10/2010 |

OTHER PUBLICATIONS

International Search Report and Written Opinion, ISAUS, PCTUS1156907, Cummins Inc., Mar. 7, 2012.

(Continued)

*Primary Examiner* — Binh Q Tran
(74) *Attorney, Agent, or Firm* — Krieg DeVault LLP (57) ABSTRACT

A method includes providing an internal combustion engine having an output shaft and producing an exhaust gas stream, providing an electric motor operatively coupled to the output shaft, and determining a regeneration state of an aftertreatment component that treats the exhaust gas stream. The method further includes determining an engine torque requirement such that, when the internal combustion engine achieves the engine torque requirement at a present set of operating conditions, a temperature of the exhaust gas stream will achieve an exhaust gas temperature threshold. The method further includes commanding the electric motor to apply a counter torque to the output shaft in response to the regeneration state indicating an active thermal regeneration event, where the counter torque comprises is high enough for the internal combustion engine to achieve the engine torque requirement. The exhaust gas temperature threshold may be a hold-warm temperature and/or a regeneration temperature.

28 Claims, 3 Drawing Sheets

(56) References Cited

U.S. PATENT DOCUMENTS

| | | |
|---|---|---|
| 4,489,242 A | 12/1984 | Worst |
| 4,588,040 A | 5/1986 | Albright, Jr. et al. |
| 5,251,588 A | 10/1993 | Tsujii et al. |
| 5,255,733 A | 10/1993 | King |
| 5,323,868 A | 6/1994 | Kawashima |
| 5,327,991 A | 7/1994 | Yoshida |
| 5,327,992 A | 7/1994 | Boll |
| 5,358,317 A | 10/1994 | Cikanek |
| 5,403,244 A | 4/1995 | Tankersley et al. |
| 5,428,274 A | 6/1995 | Furutani et al. |
| 5,433,282 A | 7/1995 | Moroto et al. |
| 5,437,157 A | 8/1995 | Bronicki |
| 5,492,189 A | 2/1996 | Kriegler et al. |
| 5,513,719 A | 5/1996 | Moroto et al. |
| 5,531,285 A | 7/1996 | Green |
| 5,558,173 A | 9/1996 | Sherman |
| 5,558,595 A | 9/1996 | Schmidt et al. |
| 5,562,565 A | 10/1996 | Moroto et al. |
| 5,635,805 A | 6/1997 | Ibaraki et al. |
| 5,643,119 A | 7/1997 | Yamaguchi et al. |
| 5,650,931 A | 7/1997 | Nii |
| 5,678,760 A | 10/1997 | Muso et al. |
| 5,713,425 A | 2/1998 | Buschhaus et al. |
| 5,722,502 A | 3/1998 | Kubo |
| 5,755,303 A | 5/1998 | Yamamoto et al. |
| 5,762,156 A | 6/1998 | Bates et al. |
| 5,775,449 A | 7/1998 | Moroto et al. |
| 5,778,326 A | 7/1998 | Moroto et al. |
| 5,788,006 A | 8/1998 | Yamaguchi |
| 5,789,881 A | 8/1998 | Egami et al. |
| 5,818,116 A * | 10/1998 | Nakae et al. ................ 290/38 R |
| 5,820,172 A | 10/1998 | Brigham et al. |
| 5,832,396 A | 11/1998 | Moroto et al. |
| 5,842,534 A | 12/1998 | Frank |
| 5,842,535 A | 12/1998 | Dennis |
| 5,845,731 A | 12/1998 | Buglione et al. |
| 5,846,155 A | 12/1998 | Taniguchi et al. |
| 5,862,346 A | 1/1999 | Kley et al. |
| 5,864,771 A | 1/1999 | Yokoyama et al. |
| 5,865,263 A | 2/1999 | Yamaguchi et al. |
| 5,871,859 A | 2/1999 | Parise |
| 5,892,346 A | 4/1999 | Moroto et al. |
| 5,908,077 A | 6/1999 | Moore |
| 5,923,093 A | 7/1999 | Tabata et al. |
| 5,924,406 A | 7/1999 | Kinugasa et al. |
| 5,934,396 A | 8/1999 | Kurita |
| 5,971,092 A | 10/1999 | Walker |
| 6,009,365 A | 12/1999 | Takahara et al. |
| 6,019,699 A | 2/2000 | Hoshiya et al. |
| 6,026,921 A | 2/2000 | Aoyama et al. |
| 6,032,753 A | 3/2000 | Yamazaki et al. |
| 6,032,869 A | 3/2000 | Ito et al. |
| 6,057,050 A | 5/2000 | Parise |
| 6,070,650 A | 6/2000 | Inoue et al. |
| 6,223,842 B1 | 5/2001 | Masaki |
| 6,223,846 B1 | 5/2001 | Schechter |
| 6,251,042 B1 | 6/2001 | Peterson et al. |
| 6,300,858 B1 | 10/2001 | Kalapodis et al. |
| 6,334,079 B1 | 12/2001 | Matsubara et al. |
| 6,367,570 B1 | 4/2002 | Long, III et al. |
| 6,374,780 B1 | 4/2002 | Rutyna et al. |
| 6,389,807 B1 * | 5/2002 | Suzuki et al. ................ 60/285 |
| 6,404,636 B1 | 6/2002 | Staggers et al. |
| 6,421,599 B1 | 7/2002 | Lippa et al. |
| 6,427,793 B1 | 8/2002 | Hanada et al. |
| 6,434,928 B1 | 8/2002 | Manaka |
| 6,452,286 B1 | 9/2002 | Kubo et al. |
| 6,464,028 B1 | 10/2002 | Imani |
| 6,467,286 B2 | 10/2002 | Hasebe et al. |
| 6,470,985 B1 * | 10/2002 | Inada et al. ............. 180/65.245 |
| 6,487,477 B1 | 11/2002 | Woestman et al. |
| 6,501,190 B1 | 12/2002 | Seguchi et al. |
| 6,515,872 B2 | 2/2003 | Nakayama et al. |
| 6,518,732 B2 | 2/2003 | Palanisamy |
| 6,533,031 B1 | 3/2003 | Garcia et al. |
| 6,568,173 B1 | 5/2003 | Kolmanovsky et al. |
| 6,570,749 B1 | 5/2003 | Ling et al. |
| 6,573,687 B2 | 6/2003 | Kimura et al. |
| 6,598,496 B2 | 7/2003 | Pannell |
| 6,616,059 B2 | 9/2003 | Sabhapathy et al. |
| 6,629,026 B1 | 9/2003 | Baraszu |
| 6,647,961 B2 | 11/2003 | Suzuki et al. |
| 6,653,002 B1 | 11/2003 | Parise |
| 6,668,953 B1 | 12/2003 | Reik et al. |
| 6,725,679 B2 | 4/2004 | Itoh et al. |
| 6,738,702 B2 | 5/2004 | Kolmanovsky |
| 6,807,931 B2 | 10/2004 | Taylor et al. |
| 6,809,429 B1 | 10/2004 | Frank |
| 6,863,139 B2 | 3/2005 | Egami et al. |
| 6,887,180 B2 | 5/2005 | Pels et al. |
| 6,901,751 B2 | 6/2005 | Bunting et al. |
| 6,910,329 B2 | 6/2005 | Bunting et al. |
| 6,912,848 B2 | 7/2005 | Bedapudi |
| 6,915,629 B2 | 7/2005 | Szymkowicz |
| 6,928,807 B2 | 8/2005 | Jacob et al. |
| 6,942,728 B2 | 9/2005 | Caillat et al. |
| 6,959,241 B2 | 10/2005 | Itow et al. |
| 6,986,251 B2 | 1/2006 | Radcliff et al. |
| 7,007,464 B1 | 3/2006 | Asami et al. |
| 7,024,858 B2 | 4/2006 | Gray, Jr. |
| 7,028,793 B2 | 4/2006 | Hu et al. |
| 7,040,434 B2 | 5/2006 | Komiyama et al. |
| 7,082,905 B2 | 8/2006 | Fukuda et al. |
| 7,100,362 B2 | 9/2006 | McGee et al. |
| 7,100,369 B2 | 9/2006 | Yamaguchi et al. |
| 7,104,347 B2 | 9/2006 | Severinsky et al. |
| 7,104,920 B2 | 9/2006 | Beaty et al. |
| 7,114,585 B2 | 10/2006 | Man et al. |
| 7,119,454 B1 | 10/2006 | Chiao |
| 7,150,938 B2 | 12/2006 | Munshi et al. |
| 7,188,020 B2 | 3/2007 | Yasui et al. |
| 7,200,476 B2 | 4/2007 | Cawthorne et al. |
| 7,213,397 B2 | 5/2007 | Hu et al. |
| 7,234,552 B2 | 6/2007 | Prema et al. |
| 7,276,815 B2 | 10/2007 | Algrain et al. |
| 7,284,594 B2 | 10/2007 | Sanada et al. |
| 7,287,506 B1 | 10/2007 | Reiners et al. |
| 7,303,504 B2 | 12/2007 | Uchisasai et al. |
| 7,340,897 B2 | 3/2008 | Zimron et al. |
| 7,360,615 B2 | 4/2008 | Salman et al. |
| 7,370,612 B2 | 5/2008 | Hanai |
| 7,377,237 B2 | 5/2008 | Carney et al. |
| 7,380,586 B2 | 6/2008 | Gawthrop |
| 7,391,129 B2 | 6/2008 | Chiao et al. |
| 7,392,871 B2 | 7/2008 | Severinsky et al. |
| 7,411,312 B2 | 8/2008 | Chiao |
| 7,448,458 B2 | 11/2008 | Meyer |
| 7,455,134 B2 | 11/2008 | Severinsky et al. |
| 7,487,030 B2 | 2/2009 | Heap et al. |
| 7,492,055 B2 | 2/2009 | Chiao |
| 7,520,351 B2 | 4/2009 | Uchisasai et al. |
| 7,520,353 B2 | 4/2009 | Severinsky et al. |
| 7,559,388 B2 | 7/2009 | Severinsky et al. |
| 7,568,539 B2 | 8/2009 | Abe et al. |
| 7,572,201 B2 | 8/2009 | Supina et al. |
| 7,577,507 B2 | 8/2009 | Mooris |
| 7,578,363 B2 | 8/2009 | Kim |
| 7,582,034 B2 | 9/2009 | Usoro |
| 7,582,980 B2 | 9/2009 | Motoike et al. |
| 7,597,164 B2 | 10/2009 | Severinsky et al. |
| 7,621,120 B2 | 11/2009 | Matheaus et al. |
| 7,633,247 B2 | 12/2009 | Obayashi |
| 7,726,130 B2 | 6/2010 | McDowell |
| 7,739,994 B2 | 6/2010 | Megilvray et al. |
| 7,748,214 B2 * | 7/2010 | Ishii et al. ...................... 60/295 |
| 7,793,492 B2 | 9/2010 | Abraham et al. |
| 7,832,194 B2 * | 11/2010 | Ichimoto et al. ................ 60/277 |
| 2003/0116368 A1 | 6/2003 | Winkelman et al. |
| 2004/0045749 A1 | 3/2004 | Jaura et al. |
| 2004/0074682 A1 | 4/2004 | Fussey et al. |
| 2006/0101809 A1 | 5/2006 | Bodo et al. |
| 2007/0112475 A1 | 5/2007 | Koebler et al. |
| 2007/0130922 A1 | 6/2007 | Dye et al. |
| 2007/0225888 A1 | 9/2007 | Morris |

| | | |
|---|---|---|
| 2007/0245737 A1 | 10/2007 | Inaba et al. |
| 2007/0289291 A1 | 12/2007 | Rabinovich et al. |
| 2008/0039263 A1 | 2/2008 | Usoro |
| 2008/0051242 A1 | 2/2008 | Usoro |
| 2008/0060589 A1 | 3/2008 | Carney et al. |
| 2008/0099256 A1 | 5/2008 | Holmes et al. |
| 2008/0103679 A1 | 5/2008 | Ruiz |
| 2008/0224478 A1 | 9/2008 | Tamor |
| 2008/0242498 A1 | 10/2008 | Miller et al. |
| 2008/0251303 A1 | 10/2008 | Rouaud et al. |
| 2008/0257311 A1 | 10/2008 | Spicer et al. |
| 2008/0300743 A1 | 12/2008 | Conlon et al. |
| 2009/0115491 A1 | 5/2009 | Anwar et al. |
| 2009/0118090 A1 | 5/2009 | Heap et al. |
| 2009/0118969 A1 | 5/2009 | Heap et al. |
| 2009/0188450 A1 | 7/2009 | Kline et al. |
| 2009/0195203 A1 | 8/2009 | Yurgil |
| 2009/0197727 A1 | 8/2009 | Janson |
| 2009/0197728 A1 | 8/2009 | Janson |
| 2009/0198429 A1 | 8/2009 | Farrel et al. |
| 2009/0199553 A1 | 8/2009 | Nishimura et al. |
| 2009/0200094 A1 | 8/2009 | Zohrer et al. |
| 2009/0200095 A1 | 8/2009 | Kawasaki |
| 2009/0205588 A1 | 8/2009 | Bilezikjian et al. |
| 2009/0205886 A1 | 8/2009 | Supina et al. |
| 2009/0209146 A1 | 8/2009 | Jegel |
| 2009/0209381 A1 | 8/2009 | Ai et al. |
| 2009/0221390 A1 | 9/2009 | Houle |
| 2009/0223727 A1 | 9/2009 | Tolksdorf |
| 2009/0324453 A1 | 12/2009 | Harinath et al. |
| 2010/0043414 A1* | 2/2010 | Hirose ............ 60/320 |
| 2010/0126692 A1 | 5/2010 | Min et al. |
| 2012/0132394 A1 | 5/2012 | Oberti et al. |

OTHER PUBLICATIONS

Schiller, Ean H., Heat Engine Driven by Shape Memory Alloys: Prototyping and Design, Thesis Submitted to the Faculty of Virginia Polytechnic Institute and State of University, Sep. 19, 2002.

International Search Report and Written Opinion, ISA/US, PCT/2011/056901, Cummins Inc., Mar. 4, 2012.

International Search Report and Written Opinion, ISA/US, PCT/US2011/066146, Cummins Inc., Mar. 29, 2012.

Ashley, Steven, SMA-based 'energy-scavenging device' could convert exhaust heat into useful power, SAE International, Mar. 2, 2010, http://www.sae.org/mags/aei/7461.

\* cited by examiner

SYSTEM, METHOD, AND APPARATUS FOR ENHANCING AFTERTREATMENT REGENERATION IN A HYBRID POWER SYSTEM

BACKGROUND

The present application relates to internal combustion engine systems as a part of a hybrid power system. Aftertreatment components often require a regeneration event to maintain or restore the function of the aftertreatment component in reducing emissions or allowing continued operation. The regeneration event in many cases includes an elevated temperature sustained over a period of time. Many applications, during nominal operation, do not generate temperatures which are elevated enough, or which are sustained for a sufficient period of time. Some engine behaviors have been developed that assist in regenerating aftertreatment components, but presently available engine behaviors to generate temperature increase emissions, significantly reduce the fuel economy of the engine, and/or result in engine operations that reduce operator satisfaction. Accordingly, there is a demand for further improvements in this area of technology.

SUMMARY

One embodiment is a unique method for increasing a work load on an internal combustion engine to assist an aftertreatment regeneration event. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

Figure 1:
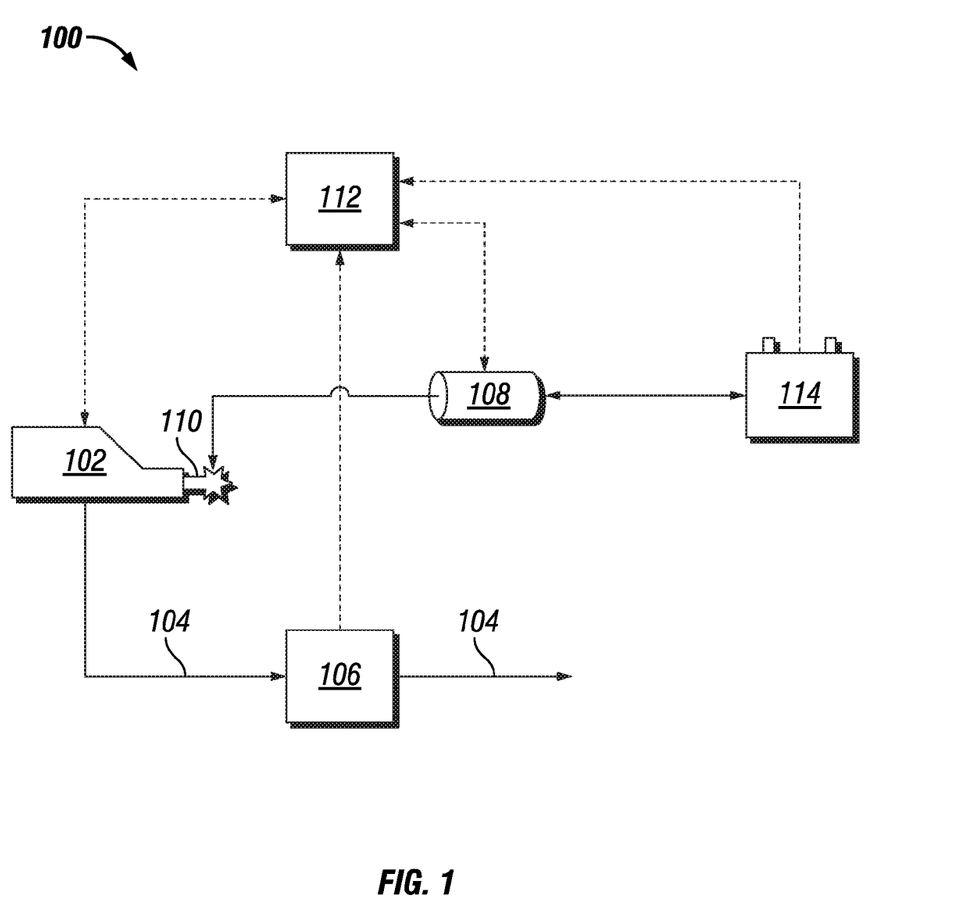
FIG. 1. is a schematic block diagram of a system for enhancing aftertreatment regeneration in a hybrid power system.

FIG. 1 is a schematic block diagram of a system 100 for enhancing aftertreatment regeneration in a hybrid power system. The system 100 includes an internal combustion engine 102 producing an exhaust gas stream 104, an aftertreatment component 106 that treats the exhaust gas stream 104. The aftertreatment component 106 requires intermittent thermal regeneration events. The aftertreatment component 106 can be any component known in the art, including without limitation an oxidation catalyst, a particulate filter, a $NO_x$ reduction catalyst, a selective $NO_x$ reduction catalyst, a three-way catalyst, and/or a four-way catalyst. The intermittent thermal regeneration event can be a soot oxidizing event, a $NO_x$ reduction event, a de-$SO_x$ event, and/or any other thermally based operation understood in the art.

The system 100 further includes an electric component 108 operatively coupled to an output shaft 110 of the internal combustion engine 102. The electric component 108 may be a motor, a generator, and/or a motor-generator. In certain embodiments, a number of electric components 108 may be provided and used in combination or alternatively depending upon the specific operating conditions.

The internal combustion engine 102 and electric component 108 may be operatively coupled by any means understood in the art, including both the engine 102 and the electric component 108 supplying motive power to a transmission, a driveline, a flywheel, a power splitter, and or connection through any other device understood in the art. Where the engine 102 and the electric component 108 are connected to the system 100 in such a way that an oppositional torque applied by the electric component 108 causes the engine 102 to increase torque to maintain the same rotational speed, the output shaft 110 and electric component 108 are operatively coupled. The electric component 108 applies oppositional torque through any means understood in the art, including operation in any of the "four quadrants" (i.e. motoring or generating in either rotational direction) depending upon the capabilities of the electric component(s) 108. The configuration of the driveline of the system 100 may be a series, parallel, series-parallel, or any other configuration understood in the art, with the only requirement that at least one electric component 108 in the system 100 is capable of operatively coupling to the engine 102 output 110 such that the electric component 108 can apply oppositional torque to the engine 102.

In certain embodiments, the system 100 further includes a controller 112 structured to perform certain operations to enhance aftertreatment regeneration. The controller 112 forms a portion of a processing subsystem including one or more computing devices having memory, processing, and communication hardware. The controller 112 may be a single device or a distributed device, and the functions of the controller may be performed by hardware or software.

The controller 112 determines an aftertreatment component regeneration state and an engine operation parameter. In response to the aftertreatment component regeneration state and the engine operation parameter, the controller 112 provides an engine loading command. The electric component 108 provides an oppositional torque to the output shaft 110 in response to the engine loading command. Providing oppositional torque includes motoring against the output shaft 110 and/or parasitically loading the output shaft 110, e.g. by turning a generator with work from the output shaft 110. The oppositional torque is provided directly to the output shaft 110, or may be provided indirectly through devices mechanically coupled to the output shaft 110. For the purposes herein, and without limitation, a fluid coupling—e.g. through a torque converter or a hydraulic clutch—is a type of mechanical coupling.

In certain embodiments, the engine operating parameter is a temperature and/or a nominal temperature of the exhaust gas stream 104, and the controller 112 provides an engine loading command in response to the regeneration state indicating an active thermal regeneration event and the nominal temperature of the exhaust gas stream 104 being lower than a threshold temperature value. The nominal temperature of the exhaust gas stream 104 is a temperature that would be present in the exhaust gas stream in the absence of oppositional torque provided by the electric component 108, and/or the temperature that would be present at the current operating conditions at a steady state operation (i.e. after any presently occurring transient operations settle). The nominal temperature of the exhaust gas stream 104 may be stored in a look-up table accessible based upon current engine operating conditions (e.g. engine fueling and timing, air flow rate, EGR fraction, ambient air temperature, etc.) and/or may be calculated by an exhaust temperature model, determined according to recent steady state history data, or determined by any other means understood in the art.

In certain embodiments, the temperature of the exhaust gas stream is utilized to determine the engine loading command. Where the temperature of the exhaust gas stream is utilized, certain operations known in the art to reduce toggling of the oppositional torque may be performed. Non-limiting examples include utilizing a temperature hysteresis value to turn on and off the engine loading command (e.g. ON at 5 degrees below the threshold temperature value and OFF at 25 degrees above the threshold temperature value), intermittently sampling the temperature of the exhaust gas stream during aftertreatment regeneration operations (e.g. sampling the exhaust gas temperature for purposes of enabling the engine loading command every 30 seconds while the engine loading command is enabled), and/or providing the engine loading command as a feedback based parameter controlling to a specified temperature value (e.g. the threshold temperature value) until an aftertreatment regeneration event is completed. The provided exemplary operations and threshold values are non-limiting, and any operations that would be understood to one of skill in the art having the benefit of the disclosures herein are contemplated.

The electric component 108 applies an oppositional torque to the output shaft 110 in response to the engine loading command. The controller 112 performs additional and/or alternate operations in various embodiments of the system 100. An exemplary controller 112 is explained in greater detail in relation to the description referencing FIG. 2.

The system 100 further includes a battery 114 electrically coupled to the electric component 108. In an exemplary embodiment, the controller 112 determines a battery state of charge (SOC) and further provides the engine loading command in response to the SOC being lower than a charging threshold. In certain embodiments, the controller 112 provides the engine loading command as a motoring command in response to a high battery SOC and provides the engine loading command as a generating command in response to a low battery SOC. In certain embodiments, the controller 112 toggles the electric component between a motoring and a generating state to achieve the oppositional torque. The toggling is in response to the battery SOC. For example, when the battery SOC is high, the procedure includes commanding the motoring state, and when the battery SOC is low, the procedure includes commanding the generating state. The toggling may occur around the charging threshold, and may further include a hysteresis charging value to prevent rapid cycling between motoring and generating.

Figure 2:
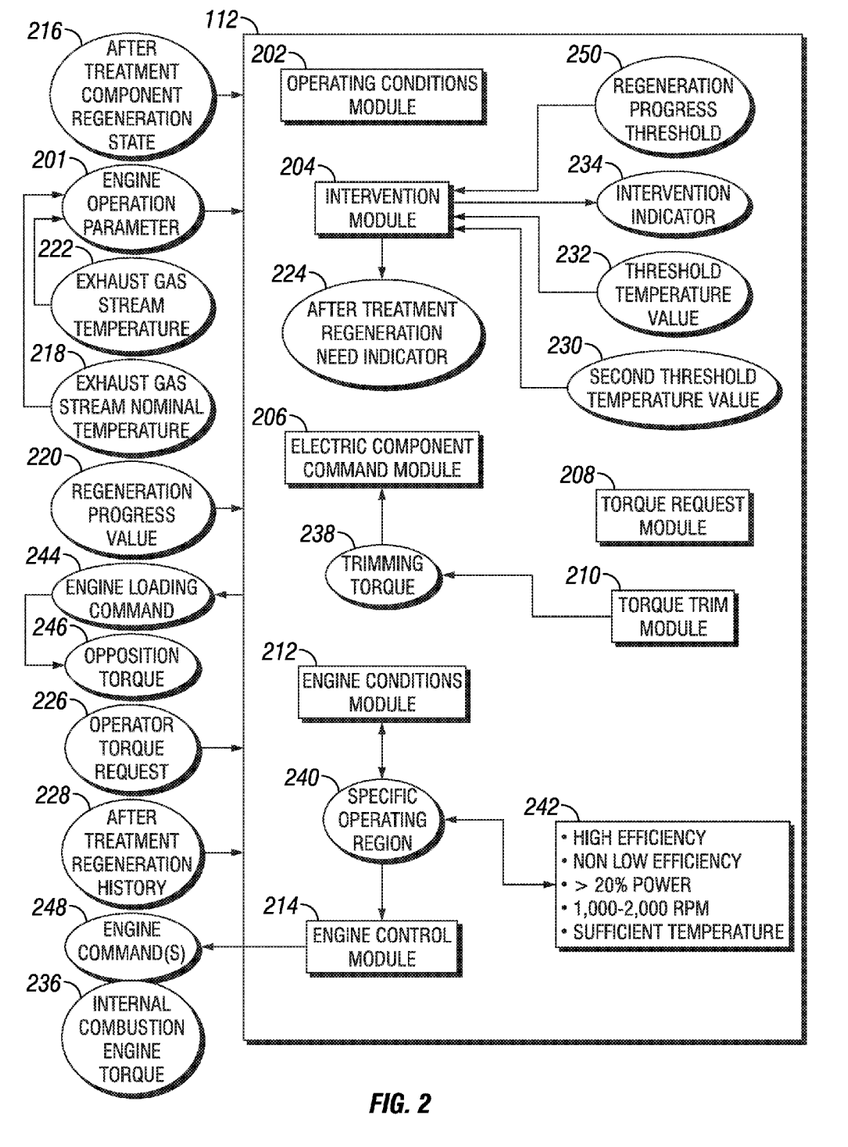
FIG. 2 is a schematic diagram of a processing subsystem that executes certain operations for enhancing aftertreatment regeneration in a hybrid power system.

FIG. 2 is a schematic diagram of a processing subsystem 200 having a controller 112 that executes certain operations for enhancing aftertreatment regeneration in a hybrid power system. In certain embodiments, the controller 112 includes modules structured to functionally execute operations for enhancing aftertreatment regeneration in a hybrid power system. The description herein includes the use of modules to highlight the functional independence of the features of the elements described.

A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. The operations of any module may be performed wholly or partially in hardware, software, or by other modules. The presented organization of the modules is exemplary only, and other organizations that perform equivalent functions are contemplated herein. Modules may be implemented in hardware and/or software on computer readable medium, and modules may be distributed across various hardware or software components.

Interpreting a data value includes, without limitation, reading the value from a memory location, receiving the value over a datalink, receiving the value as a physical value (e.g. a voltage reading from a sensor), and/or calculating the value from one or more other parameters.

The controller 112 includes an operating conditions module 202 that determines an aftertreatment. The controller 112 further includes an intervention module 204 that determines an intervention indicator 234 in response to the engine operation parameter 201 and to the regeneration state 216 indicating an active thermal regeneration event of the aftertreatment component. The active thermal regeneration event of the aftertreatment component 106 is an indication that either a regeneration event of the aftertreatment component 106 is in process (i.e. the system 100 is providing or attempting to provide the exhaust gas temperature required to regenerate the aftertreatment component 106) or that a regeneration of the aftertreatment component 106 is otherwise presently desirable (e.g. a soot loading or other indicator is at or above a desired regeneration level). Additional examples of the regeneration state 216 indicating an active thermal regeneration state include, without limitation, a determination that a present regeneration event is being attempted, a determination that a regeneration event is occurring because normal operation of the engine 102 at the present conditions has triggered a regeneration to commence, and/or a determination that the aftertreatment component 106 is in a condition where a regeneration should be attempted.

In certain embodiments, the intervention module 204 sets the intervention indicator 234 to a value indicating that temperature intervention of the electric component is presently desired, and the electric component command module 206 provides the engine loading command 244 in response to the intervention indicator 234. In certain embodiments, the controller 112 further includes the operating conditions module 202 determining whether the exhaust gas stream temperature 222 and/or the exhaust gas stream nominal temperature 218 is lower than a threshold temperature value 232, and the intervention module 204 further provides the intervention indicator 234 in response to the one of the temperatures 218, 222 being lower than the threshold temperature value 232. The controller 112 further includes the electric component command module 206 providing the engine loading command 244 in response to the intervention indicator 234.

The electric component 108 provides an oppositional torque 246 to the output shaft 110 in response to the engine loading command 244. For example, the operating conditions module 202 interprets the aftertreatment component regeneration state 216 and the engine operation parameter 201 that is a temperature and/or a nominal temperature of the exhaust gas stream. The example further includes the intervention module 204 determine that a regeneration is active and the temperature(s) 218, 222 are too low to initiate or complete the regeneration event, and in response the intervention module 204 sets the intervention indicator 234 to a value indicating that intervention is desirable. The electric component command module 206 provides an engine loading command 244 in response to the intervention indicator 234. The intervention indicator 234 can be a binary command (e.g. intervene or do not intervene) and/or include a quantitative component (e.g. intervene with 70 n-m of oppositional torque).

In a further exemplary embodiment, the controller 112 includes an engine conditions module 212 that interprets a specified operating region 240 for the internal combustion engine 102 in response to the intervention indicator 234. The controller 112 further includes an engine control module 214 that commands the internal combustion engine 102 to operate in the specified operating region 240. In certain embodiments, the specified operating region 240 is selected from a group of operation regions 242 including a high efficiency region, a region excluding low efficiency operation, a region including more than 20% of a rated engine power value, a region including engine speeds between 1,000 and 2,000 rpm inclusive, and/or a region wherein the internal combustion engine produces the exhaust gas stream at a temperature sufficient to regenerate the aftertreatment component.

The specified operating region 240 can be a region wherein the internal combustion engine produces the exhaust gas stream at a temperature sufficient to accomplish the aftertreatment regeneration, and/or at a temperature sufficient to hold the aftertreatment component in a warm condition where the regeneration can be initiated or resumed quickly when operating conditions are more favorable. The described specified operating regions 240 are exemplary and not intended to be limiting; additionally the engine conditions module 212 may select a first specified operating range 240 under some conditions and a different specified operating range 240 under other conditions.

Figure 3:
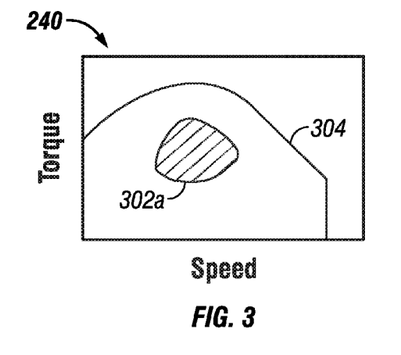
FIG. 3 is an illustration of a first specified operating region.

The specified operating region 240 can be defined in simple terms where certain areas of the engine operating space are known to be favorable or unfavorable for generating efficient temperature in the exhaust stream 104, or the specified operating region 240 may be defined with as much complexity as desired where detailed data regarding exhaust temperatures and fuel efficiency are known. For example, referencing FIG. 3, an illustrative specified operating region 302a includes an area under a torque-speed curve 304 that is known to efficiently provide temperature for the exhaust stream 104. In the example, the engine loading command 244 is selected such that the nominal engine operating point is moved into the specified operating region 302a. In certain embodiments, the engine torque only is adjusted, and the engine speed is not adjusted. However, certain applications (e.g. with a continuously variable transmission) allow adjustment of engine speed without changing the final output speed (e.g. wheel speed in a vehicle, pumping speed in a pumping application, etc.) and in such cases the engine control module 214 can provide engine operating commands 248 adjusting engine speed and torque into the specified operating region 302a without adverse effect on the expectations of an operator.

Figure 4:
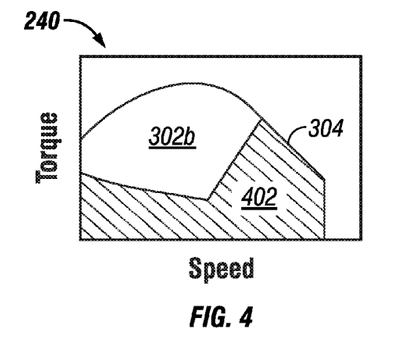
FIG. 4 is an illustration of a second specified operating region.
Figure 5:
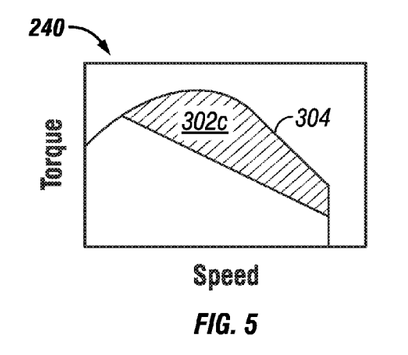
FIG. 5 is an illustration of a third specified operating region.

In another example, referencing FIG. 4, an area of low thermal efficiency generation 402 is illustrated, and the specified operating region 302b includes areas under the speed-torque curve 304 that are not within the low thermal efficiency generation 402 region. In another example, referencing FIG. 5, a specified operating region 302c includes the areas in the speed-torque curve 304 that are above a minimum power threshold. The power threshold is selected according to straightforward data sampling to determine the power required to generally create the exhaust temperatures desired, and can be described as a specific power amount (e.g. >100 kW), or as a specified percentage of total available power (e.g. 20% of maximum power, 50% of maximum power, etc.).

Figure 6:
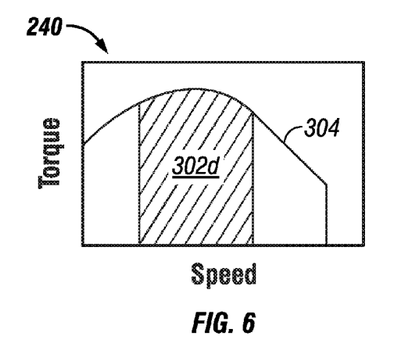
FIG. 6 is an illustration of a fourth specified operating region.
Figure 7:
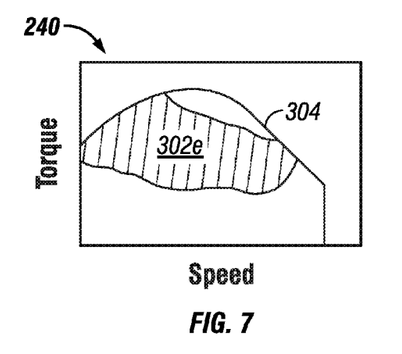
FIG. 7 is an illustration of a fifth specified operating region.

In another example, referencing FIG. 6, a specified operating region 302d includes the area between two speed thresholds such as 1,000 rpm and 2,000 rpm. In another example, referencing FIG. 7, a specified operating region 302e includes the areas under the speed-torque curve 304 wherein a desired exhaust temperature is achieved. The specified operating region 302e may include an arbitrary shape where electronic controls are available, and may further include smoothing for operation stability or other reasons, and simplification to simplify implementation and/or reduce table memory space and the like. The specified operating region 240 or regions selected for a specific embodiment depend upon details about the specific embodiment that will be known to one of skill in the art having information about the specific embodiment and the benefit of the present disclosure. Because variables affecting the final exhaust temperature such as (but not limited to) exhaust gas recirculation amounts, fuel injection timing, boost pressures, and air-fuel ratios vary for each engine 102, the specified operating regions 240 may differ from the examples (302a, 302b, 302c, 302d, 302e) presented herein both in specific values and in the relative position and character of the regions under the speed-torque curve 304, but the differences will be understood to one of skill in the art having the benefit of the disclosures herein.

The controller 112 further includes a torque request module 208 that interprets an operator torque request 226. The controller 112 further includes a torque trim module 210 that determines a trimming torque 238 such that an internal combustion engine torque 236 and the trimming torque 238 combine to achieve the operator torque request 226. The electric component command module 206 further provides the engine loading command 244 in response to the trimming torque 238. For example, the internal combustion engine torque 236 may be 1035 n-m (e.g. as requested by the engine control module 214), the operator torque request 226 may be 750 n-m, and the trimming torque 238 is therefore −285 n-m (negative 285 n-m). In the example, the electric component command module 206 provides an engine loading torque 244 that includes an oppositional torque 246 of 285 n-m.

In certain embodiments, the operating condition module 202 further determines a regeneration progress value 220 and a temperature of the exhaust gas stream 222, and the electric component command module 206 further provides the engine loading command 244 in response to the regeneration progress value 220 exceeding a regeneration progress threshold 250 and the exhaust gas stream temperature 222 being below the threshold temperature value 232. In certain embodiments, the intervention module 204 may clear the intervention indicator 234 in response to the regeneration progress value 220 indicating that the regeneration event has not progressed beyond the regeneration progress threshold 250. For example, when a regeneration event is started and has progressed beyond a certain extent defined by the regeneration progress threshold 250, the controller 112 continues the regeneration attempt after the exhaust gas stream temperature 222 falls below a temperature required to keep the regeneration progressing. Alternatively or additionally, the controller 112 allows the regeneration event to lapse when the regeneration event is started and has not progressed beyond a certain extent defined by the regeneration progress threshold 250 when the exhaust gas temperature 222 falls below the threshold temperature value 232.

In a further embodiment, the electric component command module 206 further provides the engine loading command 244 in response to the temperature 222 and/or the nominal temperature 218 being higher than a second threshold temperature value 230. An exemplary second threshold temperature value 230 is a "hold-warm" temperature value that may be insufficient to sustain regeneration of the aftertreatment component but that is close to the regeneration temperature and allows for a rapid resumption of a regeneration event if future conditions allow.

An exemplary and non-limiting description of a usage for the second threshold temperature value 230 is provided. The second threshold temperature value 230 allows the controller 112 to determine, once a regeneration event is initiated and progresses beyond the regeneration progress threshold 250, whether a lapsed regeneration event is likely to be able to be resumed in the near future, and/or whether the fuel penalty of maintaining the regeneration event will be excessive. When the temperature 222 and/or nominal temperature 218 fall below the threshold temperature value 232, an engine loading command 244 is required or desirable to achieve the regeneration temperature for the aftertreatment component 106. When the temperature 222 and/or nominal temperature 218 fall below the second threshold temperature value 230, the ability to regenerate the aftertreatment component 106 in the near future, even with the engine loading command 244, is determined to be too expensive and/or unavailable.

In certain embodiments, the operating condition module 202 further determines an aftertreatment regeneration need indicator 224 and the electric component command module 206 provides the engine loading command 244 further in response to the aftertreatment regeneration need indicator 224. For example, the regeneration need indicator 224 is an indication, without limitation, of a soot level in a particulate filter, a NOx adsorption level in a catalyst, and/or a SOx poisoning level on a catalyst. The regeneration need indicator 224 may be a binary value such as a TRUE or FALSE value indicating whether a regeneration is needed, and/or a continuous value such as a value describing a loading level, a remaining level, and the like.

In certain embodiments, the operating condition module 202 further determines an aftertreatment regeneration history 228, and the electric component command module 206 provides the engine loading command 244 further in response to the aftertreatment regeneration history 228. The aftertreatment regeneration history 228 is any description of the past regeneration events of the aftertreatment component 106 having an output usable to determine whether the aftertreatment component 106 should be regenerated. Examples of an aftertreatment regeneration history 228 include, without limitation, the time since the last successful regeneration event, an average time between the last several successful aftertreatment regeneration events, an indicator of the success or failure of the last several regeneration events, an indicator of the amount of time to complete the last several regeneration events, an indicator of the amount of time the last several regeneration events were sustained, and/or a counter value that increments with successful regeneration events and that decrements with unsuccessful regeneration events.

In an exemplary embodiment, the operating conditions module 202 determines a battery SOC 251, and the electric component command module 206 further provides the engine loading command 244 in response to the SOC 251 being lower than a charging threshold 252. In certain embodiments, the electric component command module 206 provides the engine loading command 244 as a motoring command in response to a high battery SOC 251 and provides the engine loading command 244 as a generating command in response to a low battery SOC 251. In certain embodiments, the electric component command module 206 toggles the electric component between a motoring and a generating state to achieve the oppositional torque 246. The toggling is in response to the battery SOC 251. For example, when the battery SOC 251 is high, the electric component command module 206 commands the motoring state, and when the battery SOC 251 is low, the electric component command module 206 commands the generating state. The toggling may occur around the charging threshold 252, and may further include a hysteresis charging value (not shown) to prevent rapid cycling between motoring and generating.

The descriptions which follow provide illustrative embodiments of procedures for enhancing aftertreatment regeneration in a hybrid power system. Operations illustrated are understood to be exemplary only, and operations may be combined or divided, and added or removed, as well as re-ordered in whole or part, unless stated explicitly to the contrary herein. Certain operations described may be implemented by a computer executing a computer program product on a computer readable medium, where the computer program product comprises instructions causing the computer to execute one or more of the operations, or to issue commands to other devices to execute one or more of the operations.

An exemplary procedure includes an operation to provide an internal combustion engine having an output shaft and that produces an exhaust gas stream, and an operation to provide an electric component operatively coupled to the output shaft. The procedure further includes an operation to determine an engine operation parameter and to determine a regeneration state of an aftertreatment component structured to treat the exhaust gas stream. The procedure further includes an operation to command the electric component to provide oppositional torque to the output shaft in response to the engine operation parameter and in response to the regeneration state indicating an active thermal regeneration event.

The exemplary procedure further includes an operation to determine one of a temperature and a nominal temperature of the exhaust gas stream, and the operation to command the electric component to provide the oppositional torque to the output shaft further in response to the one of the temperature and the nominal temperature of the exhaust gas stream being lower than a threshold temperature value. In a further embodiment, the procedure further includes an operation to determine an engine torque requirement such that, when the internal combustion engine achieves the engine torque requirement, the one of the temperature and the nominal temperature of the exhaust gas stream exceeds the threshold temperature value. The procedure further includes an operation to command the electric component in response to the engine torque requirement, including commanding the electric component to provide the oppositional torque such that the engine achieves the engine torque requirement. In certain embodiments, the procedure includes the threshold temperature value being one of a hold-warm temperature and a regeneration temperature.

In certain embodiments, the procedure further includes an operation to provide a battery electrically coupled to the electric component, and an operation to determine a battery state of charge (SOC). The procedure further includes an operation to command the electric component to provide the oppositional torque further in response to the SOC being lower than a charging threshold. An exemplary procedure further includes an operation to toggle the electric component between a motoring and a generating state to achieve the oppositional torque, where the operation to toggle the motoring and generating state is in response to the battery SOC. For example, when the battery SOC is high, the procedure includes commanding the motoring state, and when the battery SOC is low, the procedure includes commanding the generating state.

An exemplary embodiment includes the engine operating parameter including an engine warm-up state, and the procedure includes an operation to command the electric component further in response to the warm-up state being active. An embodiment of the procedure includes an operation to determine a regeneration progress value and one of a temperature and a nominal temperature of the exhaust gas stream. The procedure further includes an operation to command the electric component to provide the oppositional torque to the output shaft further in response to the regeneration progress value exceeding a regeneration progress threshold and in response to the temperature and/or nominal temperature of the exhaust gas stream being below a second threshold temperature value.

The exemplary procedure further includes an operation to determine an aftertreatment regeneration history, and an operation to command the electric component to provide the oppositional torque to the output shaft further in response to the aftertreatment regeneration history. An embodiment of the procedure includes an operation to command the internal combustion engine to a specified operating region in response to the regeneration state indicating the active thermal regeneration event. The exemplary procedure further includes an operation to interpret an operator torque request, and an operation to determine a trimming torque in response to the operator torque request such that an internal combustion engine torque and the trimming torque combine to achieve the operator torque request. The exemplary procedure further includes an operation to command the electric component to provide the oppositional torque to the output shaft further in response to the trimming torque.

As is evident from the figures and text presented above, a variety of embodiments according to the present invention are contemplated.

One exemplary embodiment is a system including an internal combustion engine producing an exhaust gas stream, an aftertreatment component structured to treat the exhaust gas stream, the aftertreatment component requiring intermittent thermal regeneration events, and an electric component operatively coupled to an output shaft of the internal combustion engine. The system further includes a controller that functionally executes operations to enhance aftertreatment regeneration in a hybrid power system. The controller determines a regeneration state of the aftertreatment component and an engine operation parameter, and provides an engine loading command in response to the engine operation parameter and to the regeneration state indicating an active thermal regeneration event. The electric component provides oppositional torque to the output shaft in response to the engine loading command.

In certain embodiments, the engine operating parameter is one of a temperature of the exhaust gas stream and a nominal temperature of the exhaust gas stream, and the controller further provides the engine loading command in response to the temperature and/or the nominal temperature of the exhaust gas stream being lower than a threshold temperature value. In certain embodiments, the controller further determines a regeneration progress value, and determines one of a temperature of the exhaust gas stream and a nominal temperature of the exhaust gas stream. The controller further provides the engine loading command in response to the regeneration progress value exceeding a regeneration progress threshold and the nominal temperature and/or temperature of the exhaust gas stream being lower than a threshold temperature value. In a further example, the controller provides the engine loading command further in response to the temperature and/or nominal temperature of the exhaust gas stream being higher than a second threshold temperature value.

In one example, the controller further determines an aftertreatment regeneration need indicator, and provides the engine loading command further in response to the aftertreatment regeneration need indicator. In an alternate or additional example, the controller determines an aftertreatment regeneration history, and provides the engine loading command further in response to the aftertreatment regeneration history.

The system further includes a battery electrically coupled to the electric motor, where the controller determines a state of charge of the battery, and provides the engine loading command further in response to the state of charge of the battery being lower than a charging threshold. An exemplary controller further provides an engine operating command in response to the regeneration state indicating the active thermal regeneration event, where the engine operating command causes the engine to operate in a specified operating region. In a further embodiment, the controller interprets an operator torque request, determines a trimming torque such that an internal combustion engine torque and the trimming torque combine to achieve the net operator torque request, and provides the engine loading command further in response to the trimming torque. In a still further embodiment, the specified operating region includes a high efficiency region, a region excluding low efficiency operation, a region including more than 20% of a rated engine power value, and/or a region including engine speeds between 1,000 and 2,000 rpm inclusive. In certain embodiments, the electric component is a motor, a generator, or a motor-generator.

Another exemplary embodiment is a method including providing an internal combustion engine having an output shaft and producing an exhaust gas stream, providing an electric component operatively coupled to the output shaft, determining a regeneration state of an aftertreatment component structured to treat the exhaust gas stream, and commanding the electric component to provide oppositional torque to the output shaft in response to the regeneration state indicating an active thermal regeneration event. The exemplary method further includes determining one of a temperature and a nominal temperature of the exhaust gas stream, and commanding the electric component to provide the oppositional torque to the output shaft further in response to the one of the temperature and the nominal temperature of the exhaust gas stream being lower than a threshold temperature value.

In a further embodiment, the method includes determining an engine torque requirement such that, when the internal combustion engine achieves the engine torque requirement, the one of the temperature and the nominal temperature of the exhaust gas stream exceeds the threshold temperature value. The method further includes commanding the electric component in response to the engine torque requirement, including commanding the electric component to provide the oppositional torque such that the engine achieves the engine torque requirement. In certain embodiments, the method includes the threshold temperature value being one of a hold-warm temperature and a regeneration temperature.

In certain embodiments, the method includes providing a battery electrically coupled to the electric component, determining a battery state of charge (SOC), and commanding the electric component to provide the oppositional torque further in response to the SOC being lower than a charging threshold. An exemplary embodiment includes the engine operating parameter including an engine warm-up state, and commanding the electric component further in response to the warm-up state being active. An embodiment of the method includes determining a regeneration progress value and one of a temperature and a nominal temperature of the exhaust gas stream, and further commanding the electric component to provide the oppositional torque to the output shaft further in response to the regeneration progress value exceeding a regeneration progress threshold and the temperature and/or nominal temperature of the exhaust gas stream being below a second threshold temperature value.

The exemplary method further includes determining an aftertreatment regeneration history, and commanding the electric component to provide the oppositional torque to the output shaft further in response to the aftertreatment regeneration history. An embodiment of the method includes commanding the internal combustion engine to a specified operating region in response to the regeneration state indicating the active thermal regeneration event. The exemplary method further includes interpreting an operator torque request, determining a trimming torque in response to the operator torque request such that an internal combustion engine torque and the trimming torque combine to achieve the operator torque request, and commanding the electric component to provide the oppositional torque to the output shaft further in response to the trimming torque.

Yet another exemplary embodiment is an apparatus including an operating conditions module that determines a regeneration state of an aftertreatment component and an engine operation parameter. The apparatus further includes an intervention module that determines an intervention indicator in response to the engine operation parameter and to the regeneration state indicating an active thermal regeneration event. The apparatus further includes an electric component command module that provides an engine loading command in response to the intervention indicator, and an electric component that applies a counter torque to an output shaft of the engine in response to the engine loading command. The electric component may be a motor, a generator, or a motor-generator.

An exemplary embodiment includes the engine operation parameter as a temperature of an exhaust gas stream of an internal combustion engine and/or a nominal temperature of the exhaust gas stream of the internal combustion engine, and the electric component command module further provides the electric component command in response to the temperature and/or the nominal temperature being lower than a threshold temperature value. In a further exemplary embodiment, the electric component command module further provides the electric component command in response to the temperature and/or the nominal temperature being higher than a second threshold temperature value. Another exemplary embodiment includes the intervention module further determining an aftertreatment regeneration indicator, where the electric component command module further provides the engine loading command in response to the aftertreatment regeneration need indicator.

In a further exemplary embodiment, the apparatus includes an engine conditions module that interprets a specified operating region for the internal combustion engine in response to the intervention indicator. The apparatus further includes an engine control module that commands the internal combustion engine to operate in the specified operating region. The apparatus further includes a torque request module that interprets an operator torque request, and a torque trim module that determines a trimming torque such that an internal combustion engine torque and the trimming torque combine to achieve the operator torque request. The electric component command module further provides the engine loading command in response to the trimming torque. The specified operating region includes a high efficiency region, a region excluding low efficiency operation, a region including more than 20% of a rated engine power value, a region including engine speeds between 1,000 and 2,000 rpm inclusive, and/or a region wherein the internal combustion engine produces the exhaust gas stream at a temperature sufficient to regenerate the aftertreatment component. An exemplary embodiment includes the operating conditions module further interpreting an aftertreatment regeneration history, where the electric component command module further provides the engine loading command in response to the aftertreatment regeneration history.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine producing an exhaust gas stream;
an aftertreatment component structured to treat the exhaust gas stream, the aftertreatment component requiring intermittent thermal regeneration events;
an electric component operatively coupled to an output shaft of the internal combustion engine;
a controller structured to:
determine a regeneration state of the aftertreatment component and determine an engine operation parameter, wherein the engine operating parameter comprises one of a temperature of the exhaust gas stream and a nominal temperature of the exhaust gas stream, and wherein the controller is further structured to provide the engine loading command in response to the one of the temperature and the nominal temperature of the exhaust gas stream being lower than a threshold temperature value;
provide an engine loading command in response to the engine operation parameter and further in response to the regeneration state indicating an active thermal regeneration event; and
wherein the electric component is structured to provide oppositional torque to the output shaft in response to the engine loading command.

2. The system of claim 1, wherein the controller is further structured to determine a regeneration progress value, and to provide the engine loading command further in response to the regeneration progress value exceeding a progress threshold.

3. The system of claim 2, wherein the controller is further structured to provide the engine loading command further in response to the one of the temperature of and the nominal temperature of the exhaust gas stream being higher than a second threshold temperature value.

4. The system of claim 1, wherein the controller is further structured to determine an aftertreatment regeneration need indicator, and to provide the engine loading command further in response to the aftertreatment regeneration need indicator.

5. The system of claim 1, wherein the controller is further structured to determine an aftertreatment regeneration history, and to provide the engine loading command further in response to the aftertreatment regeneration history.

6. The system of claim 1, further comprising a battery electrically coupled to the electric motor, wherein the controller is further structured to determine a battery state of charge (SOC) and to provide the engine loading command further in response to the SOC being lower than a charging threshold.

7. The system of claim 1, wherein the controller is further structured to provide an engine operating command in response to the regeneration state indicating the active thermal regeneration event, wherein the engine operating command causes the engine to operate in a specified operating region.

8. The system of claim 7, wherein the controller is further structured to:
 interpret an operator torque request;
 determine a trimming torque such that an internal combustion engine torque and the trimming torque combine to achieve the net operator torque request; and
 provide the engine loading command further in response to the trimming torque.

9. The system of claim 7, wherein the specified operating region comprises a region selected from the regions consisting of: a high efficiency region, a region excluding low efficiency operation, a region comprising more than 20% of a rated engine power value, and a region comprising engine speeds between 1,000 and 2,000 rpm inclusive.

10. The system of claim 1, wherein the electric component comprises a component selected from the components consisting of a motor, a generator, and a motor-generator.

11. A method, comprising:
 providing an internal combustion engine having an output shaft and producing an exhaust gas stream;
 providing an electric component operatively coupled to the output shaft;
 determining a regeneration state of an aftertreatment component, the aftertreatment component structured to treat the exhaust gas stream;
 determining an engine operation parameter; and
 commanding the electric component to provide oppositional torque to the output shaft in response to the engine operation parameter and further in response to the regeneration state indicating an active thermal regeneration event; and
 determining one of a temperature of the exhaust gas stream and a nominal temperature of the exhaust gas stream, and wherein commanding the electric motor to provide oppositional torque to the output shaft is further in response to the one of the temperature and the nominal temperature of the exhaust gas stream being lower than a threshold temperature value.

12. The method of claim 11, further comprising determining an engine torque requirement such that, when the internal combustion engine achieves the engine torque requirement, the one of the temperature and the nominal temperature of the exhaust gas stream exceeds the threshold temperature value, and wherein the commanding the electric component is further in response to the engine torque requirement.

13. The method of claim 11, wherein the threshold temperature value comprises a temperature selected from the temperatures consisting of: a hold-warm temperature and a regeneration temperature.

14. The method of claim 11, further comprising:
 providing a battery electrically coupled to the electric component;
 determining a battery state of charge (SOC); and
 wherein the commanding the electric component is further in response to the SOC being lower than a charging threshold.

15. The method of claim 14, further comprising toggling the electric component between a motoring and a generating state to achieve the oppositional torque, wherein the toggling is in response to the battery SOC.

16. The method of claim 11, wherein the engine operation parameter comprises a warm-up state of the engine, and wherein the commanding the electric component is further in response to the warm-up state being active.

17. The method of claim 11, further comprising determining a regeneration progress value and one of a temperature of the exhaust gas stream and a nominal temperature of the exhaust gas stream, and commanding the electric component to provide oppositional torque to the output shaft further in response to the regeneration progress value exceeding a regeneration progress threshold and the one of the temperature and the nominal temperature of the exhaust gas stream being below a second threshold.

18. The method of claim 11, further comprising determining an aftertreatment regeneration history, and commanding the electric component to provide oppositional torque to the output shaft further in response to the aftertreatment regeneration history.

19. The method of claim 11, further comprising commanding the internal combustion engine to a specified operating region in response to the regeneration state indicating the active thermal regeneration event.

20. The method of claim 19, further comprising interpreting an operator torque request, determining a trimming torque in response to the operator torque request such that an internal combustion engine torque and the trimming torque combine to achieve the operator torque request, and commanding the electric component to provide oppositional torque to the output shaft further in response to the trimming torque.

21. An apparatus, comprising:
 an operating conditions module structured to determine a regeneration state of an aftertreatment component and an engine operation parameter, wherein the engine operating parameter comprises one of a temperature of the exhaust gas stream and a nominal temperature of the exhaust gas stream, and;
 an intervention module structured to determine an intervention indicator in response to the engine operation parameter and the regeneration state indicating an active thermal regeneration event; and
 an electric component command module structured to provide an engine loading command in response to the intervention indicator wherein the electric component command module is further structured to provide the engine loading command in response to the one of the temperature and the nominal temperature of the exhaust gas stream being lower than a threshold temperature value; and an electric component structured to apply an opposition torque to an output shaft of an engine in response to the engine loading command.

22. The apparatus of claim 21, wherein the electric component comprises a component selected from the components consisting of a motor, a generator, and a motor-generator.

23. The apparatus of claim 21, further comprising an engine producing an exhaust gas stream, wherein the exhaust gas stream flows through the aftertreatment component, wherein the engine operating parameter comprises one of a temperature of the exhaust gas stream and a nominal temperature of the exhaust gas stream, and wherein the electric component command module is further structured to provide the engine loading command in response to the one of the temperature and the nominal temperature of the exhaust gas stream being lower than a threshold temperature value.

24. The apparatus of claim 23, wherein the electric component command module is further structured to provide the engine loading command further in response to the one of the temperature and the nominal temperature of the exhaust gas stream being higher than a second threshold temperature value.

25. The apparatus of claim 23, wherein the intervention module is further structured to determine an aftertreatment regeneration need indicator, and wherein the electric component command module is further structured to provide the engine loading command further in response to the aftertreatment regeneration need indicator.

26. The apparatus of claim 21, further comprising:
an engine conditions module structured to interpret a specified operating region for the engine in response to the intervention indicator;
an engine control module structured to command the internal combustion engine to operate in the specified operating region;
a torque request module structured to interpret an operator torque request;
a torque trim module structured to determine a trimming torque such that an internal combustion engine torque and the trimming torque combine to achieve the operator torque request; and
wherein the electric component command module is further structured to provide the engine loading command in response to the trimming torque.

27. The apparatus of claim 26, wherein the specified operating region comprises a region selected from the regions consisting of: a high efficiency region, a region excluding low efficiency operation, a region comprising more than 20% of a rated engine power value, a region comprising engine speeds between 1,000 and 2,000 rpm inclusive, and a region wherein the internal combustion engine produces the exhaust gas stream at a temperature sufficient to regenerate the aftertreatment component.

28. The apparatus of claim 21, wherein the operating conditions module is further structured to determine an aftertreatment regeneration history, and wherein the electric component command module is further structured to provide the engine loading command further in response to the aftertreatment regeneration history.

* * * * *